No. 753,400. PATENTED MAR. 1, 1904.
E. J. INGWERSEN.
KNOCKDOWN FEED TROUGH.
APPLICATION FILED JULY 6, 1903.
NO MODEL.
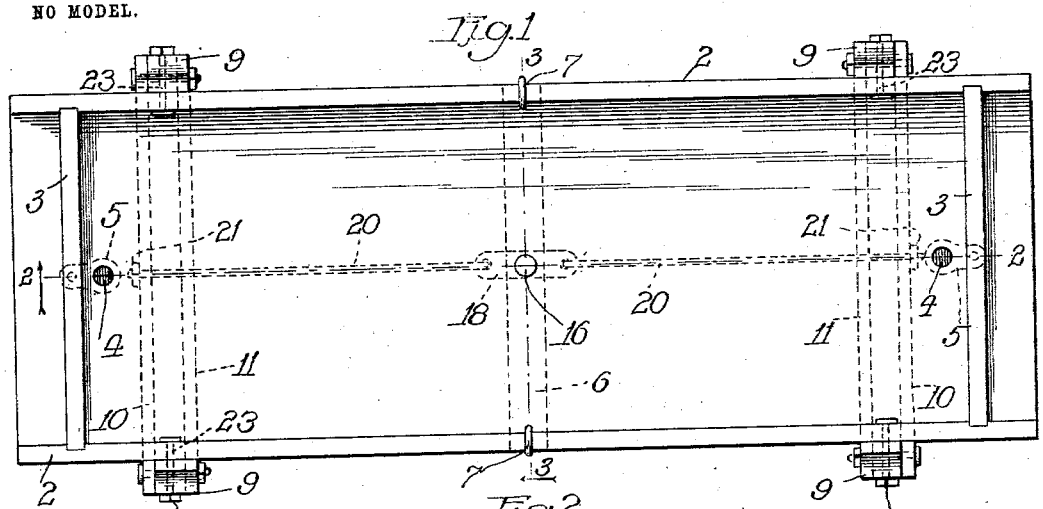
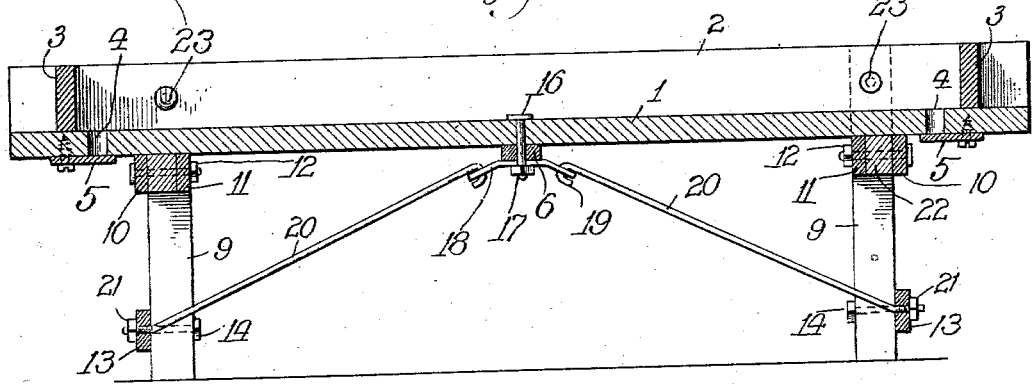
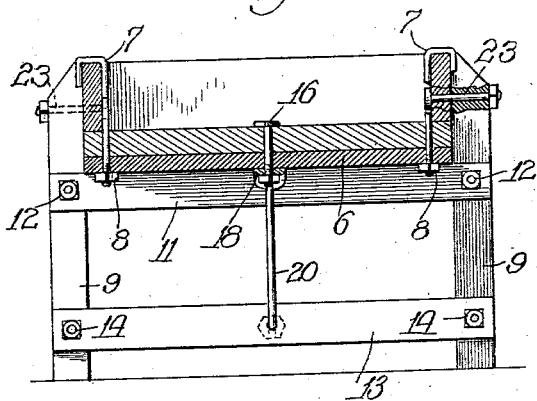
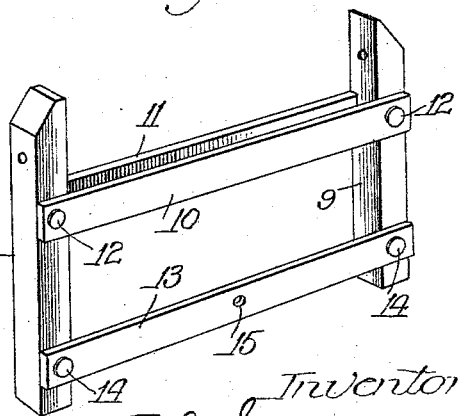
Witnesses
Edw. Barrett
Luter S. Alter
Inventor
E. J. Ingwersen
By Coburn & McRoberts
Attys
THE NORRIS PETERS CO., PHOTO-LITHO., WASHINGTON, D. C.

No. 753,400. Patented March 1, 1904.

UNITED STATES PATENT OFFICE.

EDWARD J. INGWERSEN, OF LYONS, IOWA.

KNOCKDOWN FEED-TROUGH.

SPECIFICATION forming part of Letters Patent No. 753,400, dated March 1, 1904.

Application filed July 6, 1903. Serial No. 164,280. (No model.)

*To all whom it may concern:*

Be it known that I, EDWARD J. INGWERSEN, a citizen of the United States, residing at Lyons, in the county of Clinton and State of Iowa, have invented certain new and useful Improvements in Knockdown Feed-Troughs, of which the following is a specification.

My invention relates to feed-troughs; and the object of the invention is to provide a new and improved knockdown feed-trough which may be packed for shipment in knockdown form in relatively small space or compass and may be readily assembled by the user for service in the field to provide a strong and durable structure.

The invention consists in the matters hereinafter described, and specifically pointed out in the appended claims.

In the accompanying drawings, which illustrate my invention and form a part of this specification, Figure 1 is a top plan view of a feed-trough constructed in accordance with my invention. Fig. 2 is a longitudinal sectional view of the same, taken on the line 2 2 of Fig. 1. Fig. 3 is a cross-sectional view taken on the line 3 3 of Fig. 1, and Fig. 4 is a perspective view of one of the supporting-standards.

Referring to the drawings by reference-numerals, the numeral 1 designates the bottom or base of a suitable trough of any desired size and dimensions, provided with side pieces 2 and end pieces 3, all suitably secured together in any well-known manner. The body of the trough may be of any suitable shape and preferably is in the form of an open-topped rectangular box. The bottom or base of the trough is provided at suitable locations with discharge or vent openings 4, each of which is controlled by a closing plate or valve 5, suitably pivoted to the under side of the base. A suitable cross-brace 6 is provided intermediate the ends of the trough, and stays, preferably in the form of hook-shaped screw-bolts 7, are passed down through the bottom or base and through the intermediate cross-brace 6, with their hooked ends overlying the top edges of the associated sides 2 and with their lower ends suitably secured in place, as by the nuts 8.

The body is provided with suitable supporting-standards, preferably located one at each end. Each standard consists of a pair of uprights 9, which in the preferred form of construction are adapted to extend substantially to the top edges of the sides, where their ends are beveled inwardly. The uprights are suitably united by cross-pieces, which are arranged at their lower ends and also at or near their upper ends, so as to receive and support the trough-body. The upper cross-pieces 10 and 11 are preferably arranged in alinement upon opposite sides of the uprights in such manner as to be united thereto and to each other by the bolts 12, either or both being set in channels in the uprights in order to strengthen the construction, if desired. The lower cross-pieces 13 are also suitably attached to the uprights, as by bolts 14, and each of the lower cross-pieces is provided with an opening or passage 15, intermediate its ends.

At or near the central line of the body a suitably-headed bolt 16 is passed through the base of the trough and through the intermediate cross-brace 6, its lower end being suitably screw-threaded to receive a nut 17. The lower end of the bolt 16 receives a suitable clip or bracket 18, extending in the direction of the length of the trough and provided at each end with a suitable hole or perforation to receive the hooked end 19 of a suitable leg-brace 20, whose opposite end is passed through the hole 15 of the lower cross-piece of the associated standard, being secured in place by a suitable nut 21.

The upper cross-pieces 10 and 11 are spaced apart, as clearly shown in Fig. 4, in order to form a recess or channel to receive an associated cross-rib 22, attached to the lower face of the base. The cross-ribs 22 are in length substantially equal to the width of the base and fit snugly within the recess between the cross-pieces 10 and 11 with their ends abutting upon the inner faces of the uprights. By this construction when the uprights are assembled upon the body of the trough they are properly positioned in order to receive the outer ends of the leg-braces 20 and form a rigid connection with the cross-ribs 22. The sides of the trough-body and the upper ends of the uprights are provided with holes which register when the parts are assembled and which are adapted to receive suitable connecting-pins or screw-bolts 23, which serve to prevent the uprights from moving upon the cross-ribs 22 and aid in securing the parts rigidly together.

From a consideration of the foregoing it will be apparent that when the trough is to be shipped the standards, stays, leg-braces, clip, and associated parts are detached from the trough-body and placed within the area of the trough, the preferred dimensions of the parts being such that the standards may be packed within the body of the trough by disposing the same longitudinally therein, together with the leg-braces and other parts. When the trough is to be set up for use in the field, the clip or bracket 18 is readily attached to the bolt 16 in the manner shown in the drawings and the standards are assembled in association with the cross-ribs 22. The leg-braces 20 are suitably secured in place by hooking their inner ends within the openings of the clip or bracket and by passing their outer ends through the holes 15 in the lower braces of the standards, where they are suitably secured in place by the nuts 21. The side stays 7 are also secured in position, as clearly shown in Fig. 3, adding to the rigidity of the structure and securely tying the associated parts in position. The pins 23 are passed through the registered openings in the side pieces and upper ends of the uprights, firmly securing the upper ends of the standards in place and bracing the connected parts.

It will be seen that by the construction above described I provide a feed-trough which is simple in its construction and having the parts readily detachable, so that it may be shipped in knockdown form, and that the manner of assembling the same is such as to enable the user to readily connect the parts in proper relation to secure a strong and well-braced structure. The leg-braces are so situated that they are not liable to be struck and broken or bent by the stock, and all the parts are compact and readily assembled and disassembled.

Having described my invention, what I claim is—

1. A knockdown feed-trough consisting of a trough-shaped body having a cross-rib on its lower face at or near each end, and supporting-standards each comprising a pair of uprights united by suitable cross-pieces, two of the cross-pieces of each standard being spaced apart to receive an associated cross-rib, a clip or bracket on the under side of the trough, and leg-braces connecting the bracket with cross-pieces of the standards.

2. In a knockdown feed-trough, a trough-shaped body having a cross-rib at or near each end on its lower face, an intermediate clip or bracket on its under side and having opposite holes, a pair of standards each comprising a pair of uprights and upper and lower cross-braces, the lower cross-brace having a hole or passage, the upper cross-braces being spaced apart to form a recess for one of the ribs, leg-braces having hooked inner ends to engage the clip and whose outer ends pass through the holes in the lower cross-braces, and nuts to secure the leg-braces in position.

3. In a knockdown feed-trough, a trough-shaped body composed of a suitable base, end and side pieces, a cross-rib on the under face of the base near each end, an intermediate cross-brace on the under side of the base, screw-bolts passing through the body and ends of the intermediate brace and having hooked ends to take over the top edges of the side pieces, an intermediate screw-bolt passing through the base and intermediate brace, a clip or bracket on the intermediate bolt and having holes in its opposite sides, supporting-standards composed of uprights and cross-pieces, pins passing through the upper ends of the uprights and the side pieces of the body, two of the cross-pieces being spaced apart to receive one of the cross-ribs, leg-braces having hooks at their inner ends to engage the clip and having their outer ends passing through lower cross-pieces of the standards.

In testimony whereof I affix my signature in presence of two witnesses.

EDWARD J. INGWERSEN.

Witnesses:
J. H. SCHNEIDER,
L. G. BLAINE.